Figure 1:
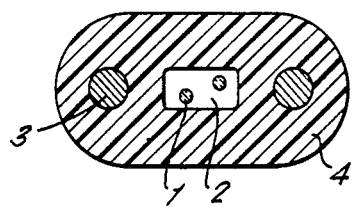

United States Patent [19]

Dean et al.

[11] 4,191,448

[45] Mar. 4, 1980

[54] OPTICAL GUIDES

[75] Inventors: Noel S. Dean; Kenneth L. Lawton; Vincent A. Yates, all of Wigan, England

[73] Assignee: BICC Limited, London, England

[21] Appl. No.: 645,333

[22] Filed: Dec. 30, 1975

[30] Foreign Application Priority Data

Jan. 6, 1975 [GB] United Kingdom ............... 423/75

[51] Int. Cl.² .............................................. G02B 5/16
[52] U.S. Cl. ................................................. 350/96.23
[58] Field of Search ............ 350/96 B, 96 WG, 96 R, 350/96.23; 174/69; 65/3 A

[56] References Cited

U.S. PATENT DOCUMENTS

| 2,434,793 | 1/1948 | Feaster | 174/69 |
| 3,333,045 | 7/1967 | Fisher et al. | 174/69 |
| 3,699,950 | 10/1972 | Humphrey, Jr. et al. | 350/96 C |
| 3,798,099 | 3/1974 | Marcatili | 350/96 B |
| 3,847,483 | 11/1974 | Shaw et al. | 350/96 B |
| 3,865,466 | 2/1975 | Slaughter | 350/96 WG |
| 3,883,218 | 5/1975 | Slaughter | 350/96 B |
| 3,887,265 | 6/1975 | Margolis et al. | 350/96 B |
| 3,920,980 | 11/1975 | Nath | 350/96 R |
| 3,942,859 | 3/1976 | Korodi | 350/96 B |
| 3,955,878 | 5/1976 | Nowak | 350/96 B |

FOREIGN PATENT DOCUMENTS 2429670  9/1975  Fed. Rep. of Germany ......... 350/96 B

*Primary Examiner*—Stewart J. Levy
*Attorney, Agent, or Firm*—Buell, Blenko & Ziesenheim

[57] ABSTRACT

An optical cable comprises at least one optical bundle and/or at least one separate optical fibre housed loosely in and throughout the length of at least one bore extending lengthwise in an extruded elongate body of rubber or plastics material so that at any transverse cross-section of the cable throughout the whole of its length liimited relative movement between the optical fibre and the extruded elongate body can take place when the cable is flexed and, embedded in the extruded elongate body throughout the whole of the length of the body and arranged side by side with the bore or bores, at least one separate elongate reinforcing member. Preferably the bore or bores and the reinforcing member or members extend substantially parallel to the axis of the extruded body and their axes lie in a substantially common plane. Alternatively, a single reinforcing member may extend centrally in the extruded body and a plurality of separate bores be arrranged around, preferably helically around, the central reinforcing member.

16 Claims, 4 Drawing Figures

OPTICAL GUIDES

This invention relates to optical guides for the transmission of the ultra-violet, visible and infra-red regions of the electromagnetic spectrum, which regions, for convenience, will hereinafter all be included in the generic term "light" and especially, but not exclusively, to optical waveguides for use in the communications field adapted for transmission of light having a wavelength within the range 0.8 to 1.3 micrometers.

The invention is especially, but not exclusively, concerned with optical guides including one or more than one optical fibre of glass or other transparent material whose refractive index is arranged to decrease over at least a part of the radius of the fibre in a direction towards the outer surface of the fibre and guides including one or more than one optical fibre of composite form comprising a core of transparent material clad throughout its length with another transparent material of lower refractive index which, by total internal refraction of light being transmitted along the fibre, confines at least a major proportion of the light within the core. A composite optical fibre is generally, but not necessarily, made up of two glasses of different refractive indices, the glass forming the core having a higher refractive index than the glass forming the cladding; the refractive index of the glass of the core may gradually decrease in a direction towards the outer surface of the core over at least a part of the distance between the central axis of the core and its outer surface. In an alternative form of composite fibre the core may be made of a transparent liquid having a higher refractive index than that of the cladding.

The present invention provides an optical guide in the form of an optical cable that is relatively inexpensive and simple to manufacture.

According to the present invention the optical cable comprises at least one optical bundle as hereinafter defined and/or one or more than one separate optical fibre housed loosely in and throughout the length of at least one bore extending lengthwise in an extruded elongate body of rubber or plastics material so that at any transverse cross-section of the cable throughout the whole of its length limited relative movement between the optical fibre and the extruded elongate body can take place when the cable is flexed and, embedded in said extruded body throughout the whole of the length of the body and arranged side by side with said bore or bores, at least one separate elongate reinforcing member.

By the expression "optical bundle" is meant a group of optical fibres or a group of fibres including one or more optical fibres and one or more non-optical reinforcing fibres or other reinforcing elongate elements. Each optical fibre and/or non-optical fibre may be of circular or non-circular cross-section.

Preferably the or each bore extends substantially parallel to the axis of the extruded elongated body and the or each elongate reinforcing member is substantially parallel to the bore or bores, the axes of the bore or bores and of the reinforcing member or members lying in a substantially common plane. Where the optical cable includes two or more elongate reinforcing members, the or each bore or at least two bores may be located between two reinforcing members. The or each bore may lie wholly in the space bounded by two planes located on opposite sides of two reinforcing members and touching both members so that the optical fibre or fibres is or are protected by the reinforcing members against crushing.

In an alternative embodiment the extruded elongate body may have a central elongate reinforcing member and a plurality of separate bores arranged around the central reinforcing member, at least one of the bores having at least one optical bundle as hereinbefore defined and/or one or more than one separate optical fibre loosely housed in it throughout its length. In this case, preferably the extruded elongate body is of substantially circular transverse cross-section and the axes of the bores are spaced at substantially equal distances from the axis of the body; preferably, also, the axis of each bore follows a substantially helical path about the central reinforcing member.

With a view to preventing mechanical damage to the surface of any optical fibre arising from abrasion with another optical fibre or other fibre when flexing of the optical cable occurs, the interstices between the fibres of the or each bundle and between the or each bundle and the boundary wall of the bore and/or between the separate optical fibres in the bore and between said fibres and the boundary wall of the bore may be filled throughout the length of the cable with a filling medium of a grease-like nature which will permit relative sliding movement between fibres when the cable is flexed. If the filling medium is a water-impermeable medium customarily employed in fully-filled telecommunication cables it will also serve as a longitudinally continuous barrier to the ingress of moisture along interstices in the bore. Preferably the filling medium employed consists of, or comprises as a major constituent, petroleum jelly.

Where the interstices in the or each bore are filled with petroleum jelly or other water-impermeable medium, to reduce the risk that the water-impermeable medium might permeate into the rubber or plastics material of the extruded elongate body the bore may be lined with a material that is impermeable to the water-impermeable medium. Where the medium is petroleum jelly the lining may be formed of a metallic tape having on at least its outer surface a coating of polyethylene or other plastics material that is preferably bonded to the material of the extruded elongate body.

As a precaution against mechanical damage arising from contact with other fibres housed in the bore, some or all of the optical fibres may have a continuous coating of a metallic material as taught in the Specification of co-pending U.S. patent application Ser. No. 640,799, filed on Dec. 15, 1975 of Raymond Jeffrey Slaughter and Patrick Vassar Andrews.

Preferably, the or each reinforcing member is of such a material and of such a cross-sectional area having regard to the material or materials and cross-sectional area of the bundle or bundles and/or of the separate optical fibre or fibres that the strain otherwise imparted to the or each optical fibre when the cable is stressed in such a way as to tend to subject the or any optical fibre to a tensile force is eliminated or reduced at least to a substantial extent by the reinforcing member or members.

The or each elongate reinforcing member may be a single solid element or, with a view to making the optical cable as flexible as possible, the or each reinforcing member may comprise a plurality of elements stranded together. The or each element is preferably of steel, carbon fibre or any other suitable material having the necessary Young's Modulus. Where the or each reinforcing member is of stranded form, for instance a strand of steel wires, the strand is preferably die-formed; that is to say a strand that has been passed through a die which effects a reduction in the overall diameter of the strand. Such a compacted strand has the advantage over non-compacted strands of a higher apparent Young's Modulus at low strain.

Where the optical cable includes two or more elongate reinforcing members, at least two of these members may be made of or may be coated with a metal or metal alloy of high electrical conductivity to provide a circuit or circuits, for instance for feeding electrical power to repeaters or regenerators.

Where each reinforcing member is of stranded form, at least one of the elements of the strand may be of metal or metal alloy of high electrical conductivity. For example, in a stranded reinforcing member consisting of six elements stranded around a central element, the central element may be of steel and the surrounding six elements of copper or, in an alternative construction, all of the elements of the strand may be of hard drawn copper or cadmium copper.

Suitable materials of which the extruded elongate body may be made include polyethylene, for example high density polyethylene, a hard polyolefin such as polypropylene or a modified polypropylene, for example propylene ethylene copolymer. The extruded elongate body may have an oversheath of a material having a low friction coefficient, such as nylon. Where an oversheath is provided, the extruded elongate body and the oversheath may be separated by a layer of metallic tape having on its major surfaces coatings of plastics material that are bonded to the materials of the extruded elongate body and of the oversheath.

The present invention further includes a method of manufacturing an optical cable as hereinbefore described, which method comprises causing at least one optical bundle and/or one or more than one separate optical fibre and at least one separate elongate reinforcing member to travel in the direction of their lengths towards and through an extrusion machine and extruding therearound an elongate body of rubber or plastics material in such a way that the optical bundle and/or the optical fibre or fibres is or are housed loosely in and throughout the length of at least one bore extending lengthwise in the extruded body and that the or each separate elongate reinforcing member is embedded in the extruded body side by side with said bore or bores.

The invention is further illustrated by a description, by way of example, of four preferred forms of optical cable with reference to the accompanying drawing which shows, on enlarged scales, cross-sectional end views of the four cables.

The optical cable shown in FIG. 1 comprises an extruded elongate body 4 of polyethylene having a bore 2 and, embedded in the extruded body on opposite sides of the bore, two steel wires 3 so arranged that their axes and the axis of the bore are substantially parallel and lie in a substantially common plane. Two separate optical fibres 1 are housed loosely in and throughout the length of the bore 2. The elongate body 4 has a major transverse dimension of 8 mm and a minor transverse dimension of 4 mm. Each wire 3 has a diameter of 1.02 mm and the bore 2 has a major transverse dimension of 2 mm and a minor transverse dimension of 1 mm.

Figure 2:
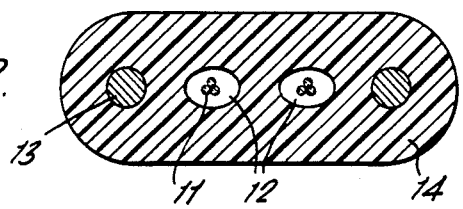

In the optical cable shown in FIG. 2, an extruded elongate body 14 of polyethylene has two bores 12 spaced on opposite sides of, and extending substantially parallel to, the body. Two steel wires 13 are embedded in the body 14 on opposite sides of the two bores 12 with their axes substantially parallel to, and lying in substantially the same plane as, the axes of the bores. Housed loosely in and throughout the length of each bore 12 is an optical bundle 11 comprising three optical fibres assembled together. The elongate body 14 has a major transverse dimension of 11 mm and a minor transverse dimension of 4 mm. Each wire 13 has a diameter of 1.02 mm and each bore 12 has a major transverse dimension of 1.5 mm and a minor transverse dimension of 1 mm.

Figure 3:
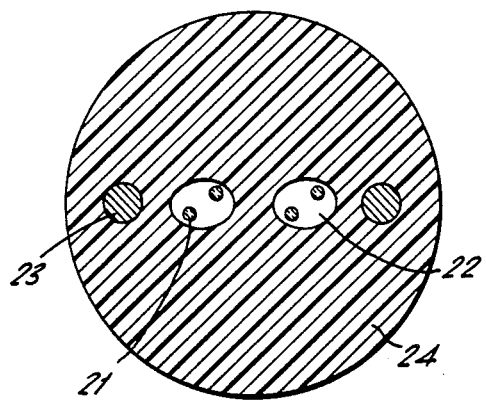

The optical cable illustrated in FIG. 3 comprises an extruded elongate body 24 of polyethylene which is of substantially circular cross-section and which has two bores 22 spaced on opposite sides of, and extending substantially parallel to, the axis of the body. Two steel wires 23 are embedded in the body and are arranged on opposite sides of the bores 22 with the axes of the wires extending substantially parallel to, and lying in substantially the same plane as, the axes of the bores. Two separate optical fibres 21 are housed loosely in and throughout the length of each bore 22. The body 24 has a diameter of 10 mm. Each wire 23 has a diameter of 1.02 mm and each bore 22 has a major transverse dimension of 1.5 mm and a minor transverse dimension of 1.25 mm.

Figure 4:
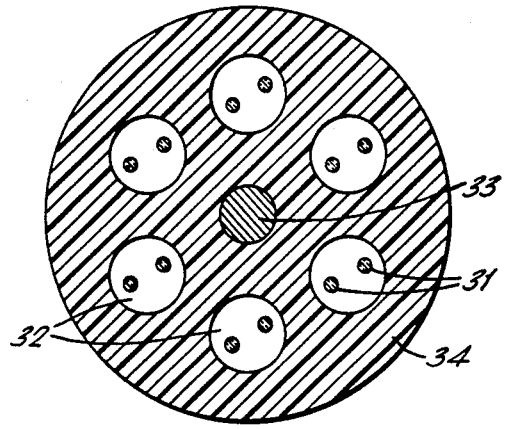

In the optical cable illustrated in FIG. 4, an extruded elongate body 34 of polyethylene is of substantially circular cross-section and has a centrally disposed steel wire 33 embedded in it. Extending helically about the wire 33 are six bores 32, each of circular cross-section and each housing loosely throughout its length two separate metal coated optical fibres 31. The body 34 has a diameter of 10.5 mm and the steel wire 33 has a diameter of 1.63 mm. Each bore 32 has a diameter of 2 mm and a lay length of approximately 300 mm.

What we claim as our invention is:

1. An optical cable comprising at least one optical fibre housed loosely in and throughout the length of a bore extending lengthwise in an extruded elongate body of insulating material so that at any transverse cross-section of the cable throughout the whole of its length limited relative movement between the optical fibre and the extruded elongate body can take place when the cable is flexed; at least one separate elongate reinforcing member embedded in said extruded elongate body throughout the whole of the length of the body and arranged side by side with said bore; and, lining the boundary wall of the bore, a metallic tape having on at least its outer surface a coating of plastics material.

2. An optical cable as claimed in claim 1, wherein the outer plastics coating on the metallic lining tape of the bore is bonded to the material of the extruded elongate body.

3. An optical cable as claimed in claim 1, wherein the optical fibre of each of at least some of the optical fibres in the bore has a continuous coating of a metallic material.

4. An optical cable as claimed in claim 1, wherein the reinforcing member is of such a material and of such a cross-sectional area having regard to the material and cross-sectional area of the optical fibre or fibres that the strain otherwise imparted to the or each optical fibre when the cable is stressed in such a way as to tend to subject the or any optical fibre to a tensile force is reduced at least to a substantial extent by the reinforcing member.

5. An optical cable as claimed in claim 1, wherein the or each elongate reinforcing member comprises a plurality of elongate elements stranded together.

6. An optical cable as claimed in claim 5, wherein the or each stranded elongate reinforcing member is die-formed.

7. An optical cable as claimed in claim 5, wherein at least one of the elongate elements of each of at least two of the stranded reinforcing members is of a metallic material of high electrical conductivity.

8. An optical cable as claimed in claim 1, wherein the optical cable includes at least two elongate reinforcing members having an outer surface of a metallic material of high electrical conductivity.

9. An optical cable as claimed in claim 1, wherein the extruded elongate body has an oversheath of a material having a low friction coefficient.

10. An optical cable as claimed in claim 9, wherein the extruded elongate body and the oversheath are separated by a layer of metallic tape having on its major surfaces coatings of plastics material that are bonded to the materials of the extruded elongate body and of the oversheath.

11. An optical cable as claimed in claim 1, wherein the axes of the bore and of the reinforcing member or members lie in a substantially common plane.

12. An optical cable as claimed in claim 11, which includes at least two separate elongate reinforcing members, wherein the bore is located between two reinforcing members.

13. An optical cable as claimed in claim 12, wherein the bore lies wholly in the space bounded by two planes located on opposite sides of two reinforcing members and touching both members.

14. An optical cable as claimed in claim 1, in which a plurality of optical fibres are housed loosely in the bore, wherein the interstices between the fibres and between said fibres and the boundary wall of the bore are substantially filled throughout the length of the cable with a filling medium of a grease-like nature.

15. An optical cable as claimed in claim 14, wherein the filling medium comprises petroleum jelly.

16. An optical cable comprising an extruded elongate body of insulating material which has a central elongate reinforcing member embedded in the body and has a plurality of separate bores extending lengthwise in the body and arranged around the central reinforcing member, said extruded elongate body being of substantially circular transverse cross-section and the axes of the bores are spaced at substantially equal distances from the axis of the body, and housed loosely in and throughout the length of at least one of the bores, at least one optical fibre, wherein the axis of each bore follows a substantially helical path about the central reinforcing member.

* * * * *